United States Patent [19]

Umeyama et al.

[11] Patent Number: 4,693,354

[45] Date of Patent: Sep. 15, 1987

[54] CLUTCH DAMPER

[75] Inventors: Mitsuhiro Umeyama; Kaoru Wakahara; Hisao Ohtani, all of Toyota; Kenichi Kametaka, Fujisawa; Masaru Kinoshita, Fujisawa; Nobuyuki Kobayashi, Fujisawa, all of Japan

[73] Assignees: Toyota Jidosha Kabushikikaisha, Toyota; Nok-Megulastik Co., Ltd., Tokyo, both of Japan

[21] Appl. No.: 822,987

[22] Filed: Jan. 27, 1986

[30] Foreign Application Priority Data

Feb. 19, 1985 [JP] Japan .............................. 60-21332[U]

[51] Int. Cl.$^4$ ................................................ F16D 3/60
[52] U.S. Cl. ............................... 192/106.1; 192/70.17; 464/903; 464/90; 464/85
[58] Field of Search ............... 192/106.1, 106.2, 70.18, 192/70.17, 70.16; 464/90, 903, 85

[56] References Cited

U.S. PATENT DOCUMENTS

| 1,881,127 | 10/1932 | Paton et al. | 192/70.17 |
| 3,039,578 | 6/1962 | Peras | 192/106.1 |
| 3,557,573 | 1/1971 | Hänsgen | 464/90 |
| 4,558,773 | 12/1985 | Schäfer | 192/106.1 |
| 4,560,367 | 12/1985 | Wolf et al. | 192/106.1 X |
| 4,570,775 | 2/1986 | Caray et al. | 192/106.1 X |
| 4,572,344 | 2/1986 | Horiuchi et al. | 192/106.1 |

Primary Examiner—Carl D. Friedman
Assistant Examiner—Creighton Smith
Attorney, Agent, or Firm—Jordan and Hamburg

[57] ABSTRACT

A clutch damper for absorbing vibrations occurring during transmission of torque in a clutch mechanism for automobiles or the like, wherein a plurality of buffer members stepwisely operated are provided between a hub slipped over a shaft and a clutch disc, and a spacer member for restraining a play of the members to transmit the torque smoothly is provided.

5 Claims, 16 Drawing Figures

CLUTCH DAMPER

BACKGROUND OF THE INVENTION

The present invention relates to a cluch damper for absorbing vibrations occurring during transmission of torque in a clutch mechanism.

The clutch mechanism, which intermittently transmits torque transmitted from a driving portion, normally has a natural frequency caused by resiliency possessed by a driving system forming member and has disadvantages in that not only a resonance phenomenon is generated due to specific torque variation to produce noises but inferior torque transmission occurs. In the past, the clutch mechanism is provided with vibration absorbing means such as a spring, a resilent rubber member or the like.

Figure 16:
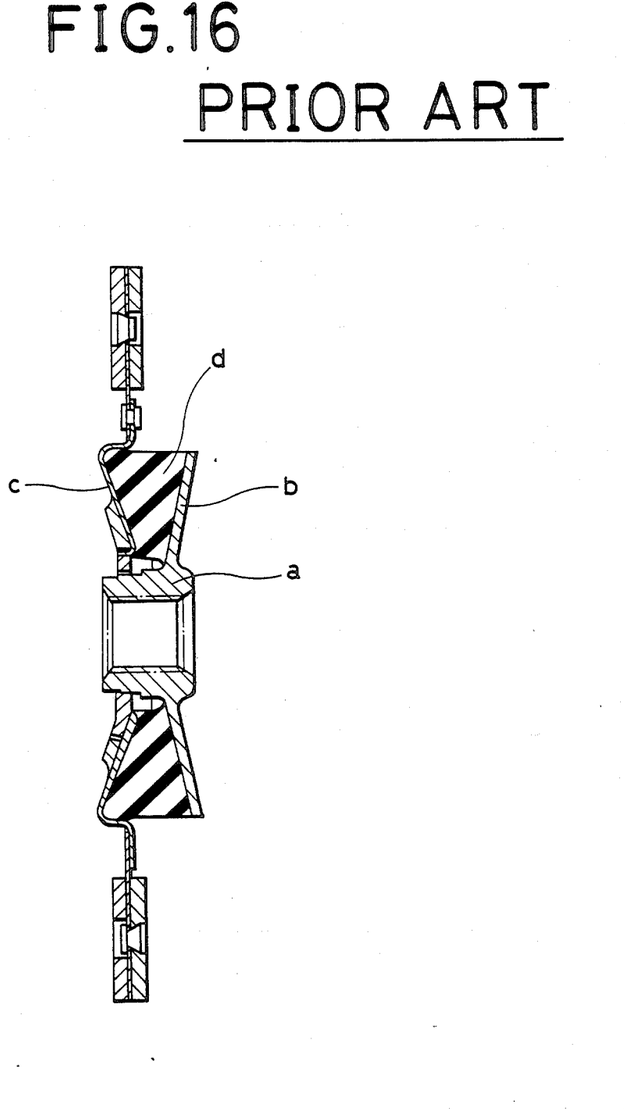
FIG. 16 is a sectional view of a conventional clutch damper.

FIG. 16 shows a conventional clutch damper of a single shearing type which uses a resilient rubber member as the vibration absorbing means. This means has an approximately cylindrical shape comprising a hub a having a flange b integrally formed at one end thereof and having a spline formed in the inner periphery thereof, a clutch plate c approximately in the form of a double ring and arranged opposite to a flange b of the hub a, and a buffer rubber d formed into an annular body made of a rubber-like resilient material, the buffer rubber d being baked between said both members b and c, whereby the vibration is absorbed by the resiliency of the buffer rubber d.

However, since the torsional resiliency of the aforementioned single shearing type clutch damper is constant, the vibration cannot be absorbed effectively irrespective of the magnitude of transmission torque. More specifically, in the case where for example, in the clutch of an automobile, the buffer rubber is set so as to have a rigidity which withstands a great torque, there arises a problem in that a sufficient vibration absorbing power cannot be obtained in a low torque state during idling or the like.

In addition, in a clutch damper which makes use of a compression resiliency of a coil spring as the buffer means, a torsional angle for the buffer is restricted by a compressible amount of the coil spring, and therefore a large torsional angle cannot be empolyed; which is disadvantageous in terms of absorption of vibration.

SUMMARY OF THE INVENTION

It is therefore an object of the present invention to provide a clutch damper which can exhibit a sufficient vibration absorbing power irrespective of magnitude of the transmission torque.

For achieving the aforementioned object, a clutch damper according to the present invention basically comprises a hub having an approximately cylindrical shape with an outwardly spread first plate provided thereon, said hub being slipped over a shaft, a first buffer member formed into an annular body of a rubber-like resilient material and fitted and secured in the outer periphery of said hub, a boss having an approximately cylindrical shape and fitted and secured in the outer periphery of said first buffer member, a second buffer member formed into an annular body of a rubber-like resilient material and secured in the outer periphery of said boss, a cylindrical body and a second plate provided with a plate body spread outwardly from said cylindrical body and secured in the outer periphery of said second buffer member, wherein a stopper mechanism for holding a relative rotation within a predetermined angle is disposed between said hub and said boss and between said first plate of said hub and said second plate, and at least two-stage buffer mechanism is provided for effective operation.

While the outline of the present invention has been briefly described, other objects and novel features of the present invention will be better understood from reading of the ensuing detailed description in connection with the accompanying drawings.

It should be noted that the drawings merely illustrate one embodiment for explanation of the present invention and are not intended to limit the technical scope of the present invention.

DESCRIPTION OF THE PREFERRED EMBODIMENTS

The embodiments of the present invention will now be described with reference to the drawings, in which FIGS. 1 to 4 show a first embodiment.

In these drawings, reference numeral 1 designates a hub having a cylindrical shape and with a spline provided internally thereof, and an outwardly spread first plate 2 is serration fitted ( a portion A in FIG. 1) at one axial end. A first buffer member 3 has an inner ring 4 retained in the outer periphery of the hub 1 and coupled thereto. The first buffer member 3 is formed into an annular body of a rubber-like resilient material, to which are secured the inner ring 4 and an outer ring 5.

A boss 6 comprises a cylindrical portion 7 and a diametral portion 8 extending from one end of the cylindrical portion 7 to an obliquely inward portion. The boss 6 is coupled to the first buffer member 3 by the engagement of the cylindrical portion 7 and the outer ring 5, and has a second buffer member 9, which is formed into an annular body of a rubber-like resilient material, is baked on the outer periphery of the cylindrical portion 7. An engaging recess 12 corresponding to an engaging projection 11 projected in the outer periphery of the hub 1 is formed in the extreme end of the diametral portion 8 of the boss 6, and a first stopper mechanism 10 is provided to restrict excessive relative rotation between the boss 6 and the hub 1. A spacer member comprising four members, i.e. a thrust plate 13, a thrust bearing 14, a radial bearing 15 and a centering plate 16 having a J-letter section is disposed within a space surrounded by the first stopper mechanism 10, the hub 1, the boss and the first buffer member 3 so as to prevent axial and diametral play of the hub 1 and the boss 6. A second plate 17 baked on the outer periphery of the second buffer member 9 comprises a cylindrical body 18 extending along the second buffer member 9 and an outwardly spread double-ring like plate 19 integral with the cylindrical body 18. An annular third plate 20 is spaced from and opposed to the plate 19 and coupled to the latter by means of a connecting rivet 21, and a projection 22 integrally formed in the outer peripheral end of the first plate 2 secured to the hub 1 is sandwiched between the third plate 20 and the double-ring like plate 19. A spring member 23 formed of a rubber-like resilient material is disposed (FIG. 3) on the circumference suitably spaced from the projection 22 of the first plate 2 and is held by the second plate 17 and the third plate 20. The aforesaid rivet 21 adapted to connect both the plates 17 and 20 is fitted into a hole 24 formed in the projection 22 of the first plate 2 so that the rivet is engaged with the projection 22 in order to restrict excessive relative rotation between the first plate 2 and both plates 17, 20 these latter elements thereby constituting a second stopper means 25. A clutch disc 26 is connected to the double-ring like plate 19 through a cushioning plate 27.

In the clutch damper constructed as described above, when torque is loaded on the hub 1, the torque of the hub 1 is transmitted to the boss 6 only by the shearing stress of the first buffer member 3, transmitted to the second plate 17 by the shearing force of the second buffer member 9 and transmitted to a driven side via the clutch disc 26. After the engaging projection 11 of the hub 1 and the engaging recess 12 of the boss 6 have been engaged with each other upon increase of the torque, the shearing force applied to the first buffer member 3 is maintained constant, and the shearing force of the second buffer member 9 increases. Relative rotation of the second and third plates 17 and 20 to the first plate 2 increases so that the projection 22 of the first plate 2 comes into contact with the end of the spring member 23, after which a compression load with respect to the spring member 23 is applied. Relative rotation of the first plate 2 to the second and third plates 17 and 20 increases so that the rivet 21 for connecting the second and third plates 17 and 20 comes into contact with the projection 22 of the first plate 2, after which even if the transmission torque increases, relative rotation of the second and third plates 17 and 20 to the first plate 2 is not increased, and the hub 1, boss 6, second plate 17 and third plate 20 rotate together.

Figure 8:
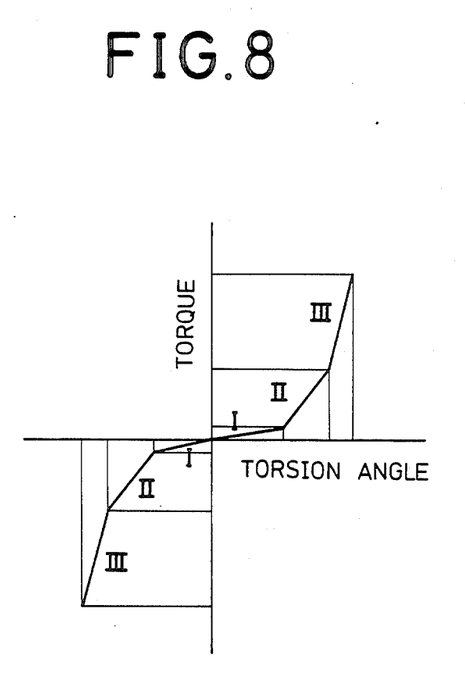
FIG. 8 is a schematic graphic representation showing the torsional characteristics.
Figure 9:
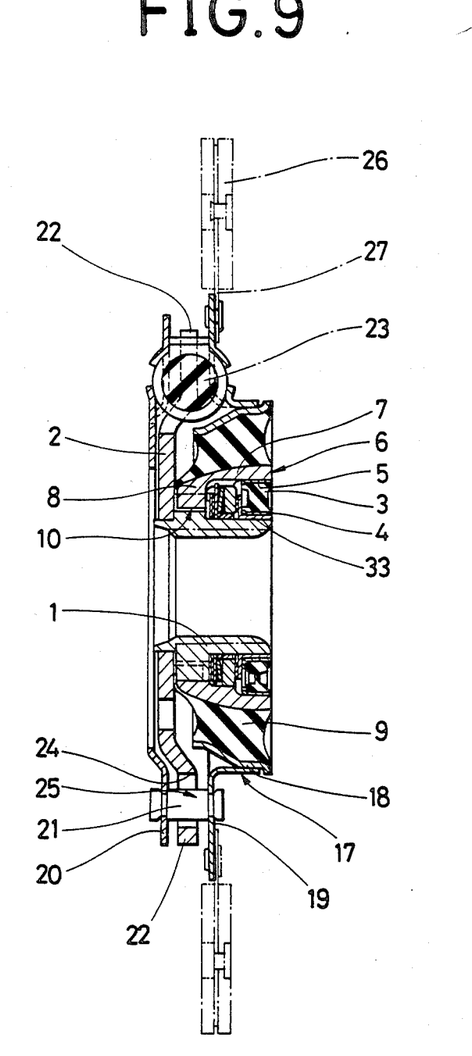
FIG. 9 is a sectional view taken on line IX—IX of FIGS. 12 and 13 of a clutch damper according to a third embodiment of the present invention.
Figure 10:
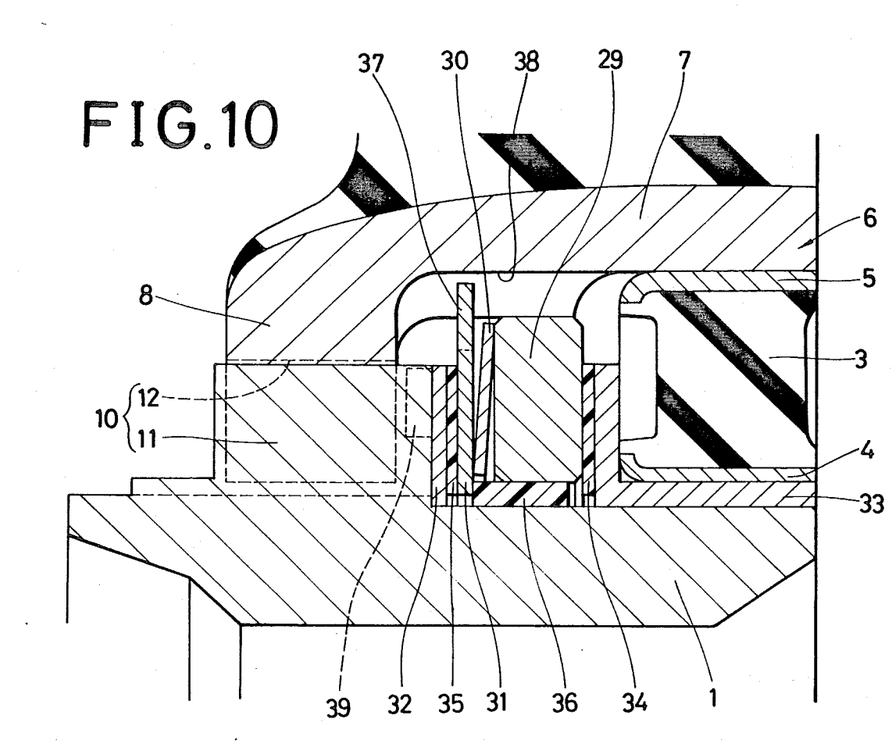
FIG. 10 is an enlarged sectional view showing major portions of the clutch damper according to the embodiment.

Accordingly, the above-designed clutch damper is provided with an arrangement in which torque is transmitted via a plural-stage of buffer means whereby adequate torque transmission power and vibration absorbing power may be set according to the magnitude of transmission torque. Therefore the clutch damper is effectively used for the clutch mechanism which involves variation in torque. FIG. 8 is a general graph showing the torsional characteristics of the clutch damper. In this graph, in I-region, the first buffer member 3 is acted to represent the torsional rigidity thereof; in II-region and III-region, the second buffer member 9 and spring member 23, respectively, are mainly acted to absorb the vibration resulting from torque transmission. The shift from I-region to II-region and from II-region to III-region is smoothly carried out by the operation of the first and second stopper mechanisms. In I-region, tooth-hammering sounds (which are commonly called 'rattle sounds') of the transmission mainly during the low speed rotation (idling or the like) are absorbed; in II-region, abnormal noises and confines sounds from the differential transmission from the low to high speed region are absorbed; and in III-region, the high torque is transmitted to absorb variation in torque or the like. In the above-described arrangement, particularly the first stopper mechanism 10 is composed of a combination of the engaging projection 11 of the hub 11 and the engaging recess 12 and is arranged between the first plate 2 and the first buffer member 3. Therefore the damper may be easily assembled. Moreover, since the spacer member is disposed in the space surrounded by the hub 1, boss 6, stopper mechanism 10 and first buffer member 3 to restrain the play between the hub 1 and the boss 6, and therefore the damper having a relatively complicated construction may be provided for assurance of smooth operation. The centering plate 16 having a J-letter section in the spacer member is fitted in the inner periphery of the boss 6 and is rotated as the boss 6 operates.

Figure 1:
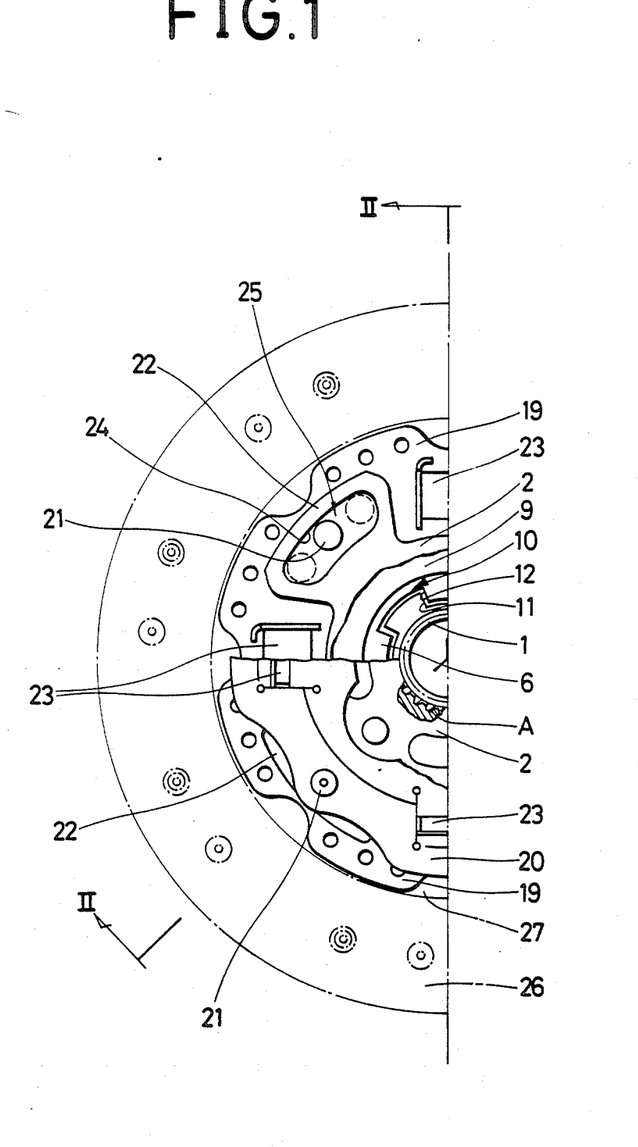
FIG. 1 is a half sectional front view with a part cutaway of a clutch damper according to one embodiment of the present invention.
Figure 2:
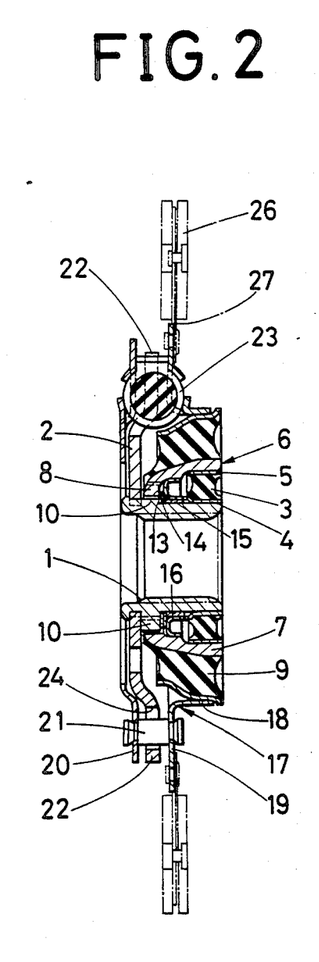
FIG. 2 is a sectional view taken on line II—II of FIGS. 1 and 3 of the clutch damper according to the embodiment.
Figure 3:
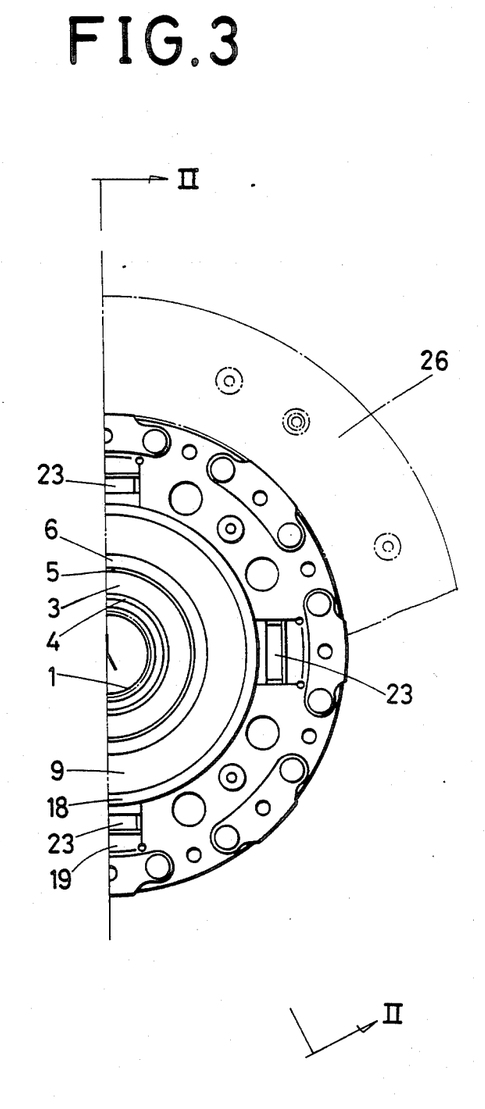
FIG. 3 is a half sectional rear view of the clutch damper according to the embodiment.
Figure 4:
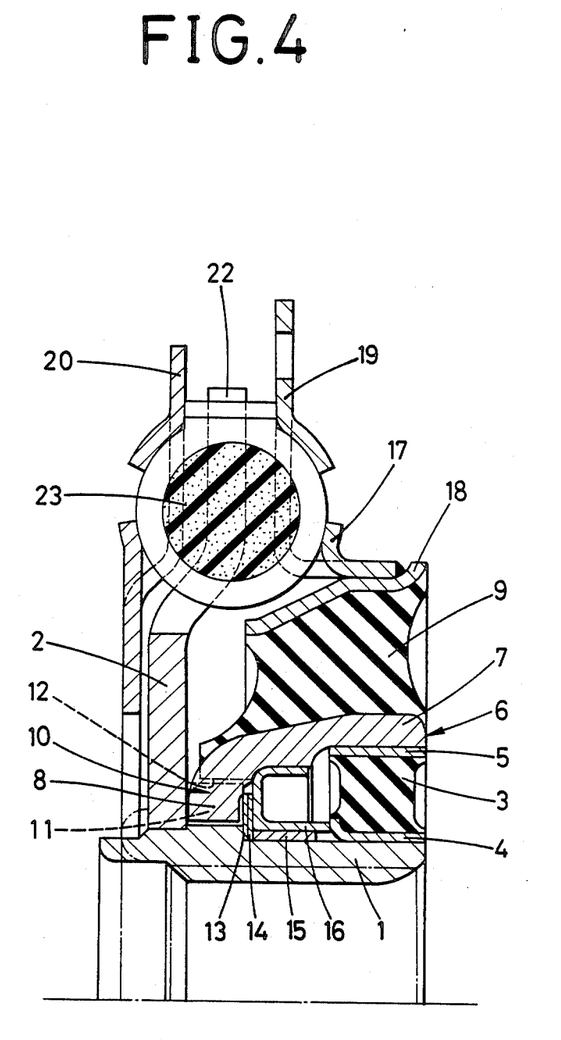
FIG. 4 is an enlarged sectional view showing major portions of the clutch damper according to the embodiment.
Figure 5:
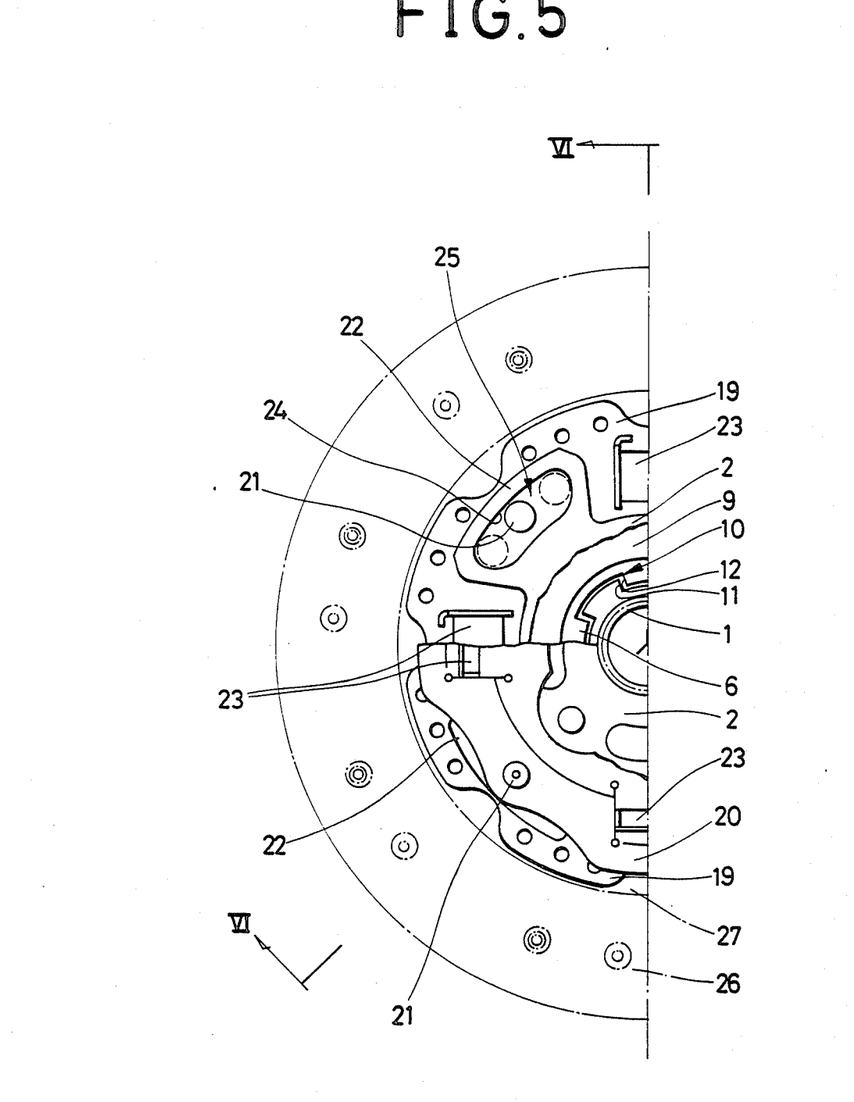
FIG. 5 is a half front view with a part cutaway of a clutch damper according to a second embodiment of the present invention.
Figure 6:
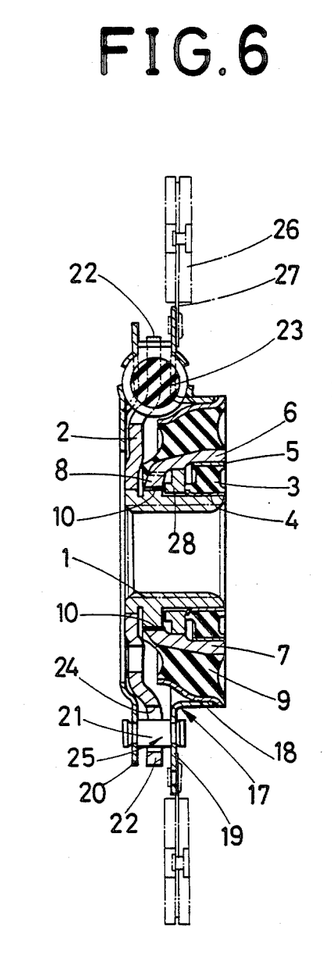
FIG. 6 is a sectional view taken on line VI—VI of FIGS. 5 and 7 of the clutch damper according to the embodiment.
Figure 7:
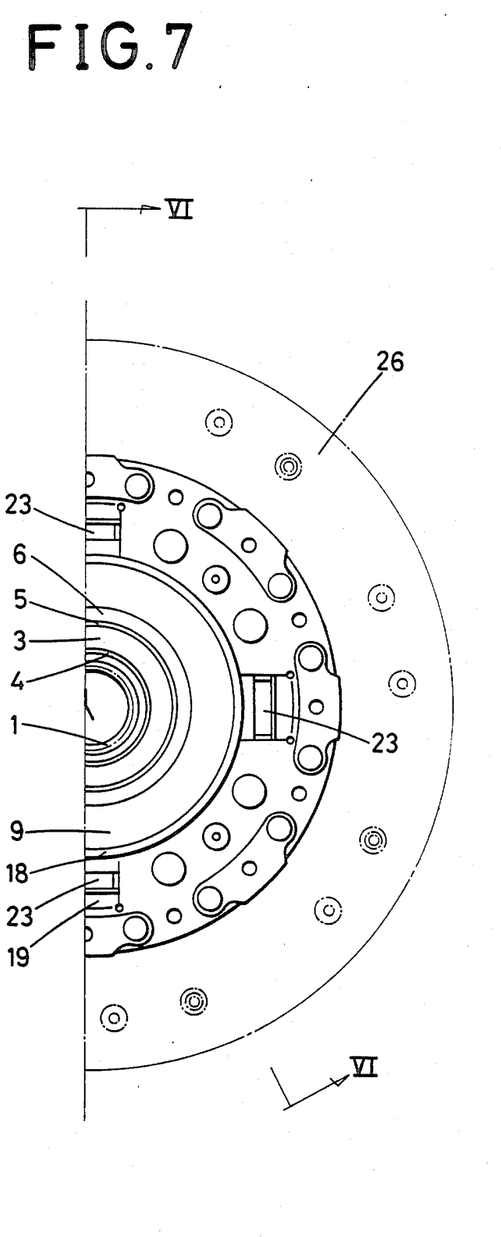
FIG. 7 is a half sectional rear view of the clutch damper according to the embodiment.

The spacer member may comprise a single thrust bearing 28 made of resin (such as fluorine resin) as shown in FIGS. 5 to 7 in a second embodiment or may comprise, as in a clutch damper shown in FIGS. 9 to 13 as a third embodiment, a center plate 29, a plate spring 30, a first thrust plate 31 and a second thrust plate 32, a fluorine resin thrust bearing 34 disposed between a sleeve 33 (interposed between the hub 1 and the inner ring 4) and the center plate 29, a fluorine resin thrust bearing 35 disposed between first and second plates 31, 32, and a fluorine resin radial bearing 36 interposed between the hub 1 and the center plate 29.

Figure 11:
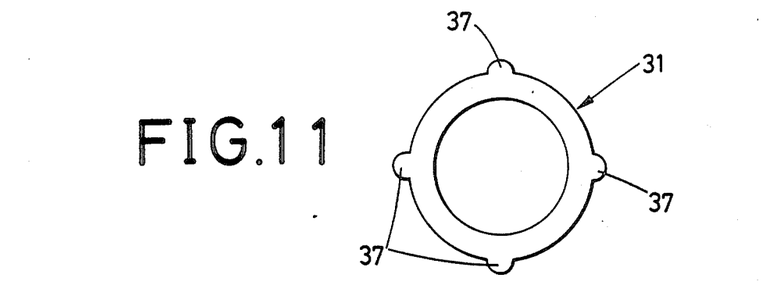
FIG. 11 is a front view of a first thrust plate.
Figure 12:
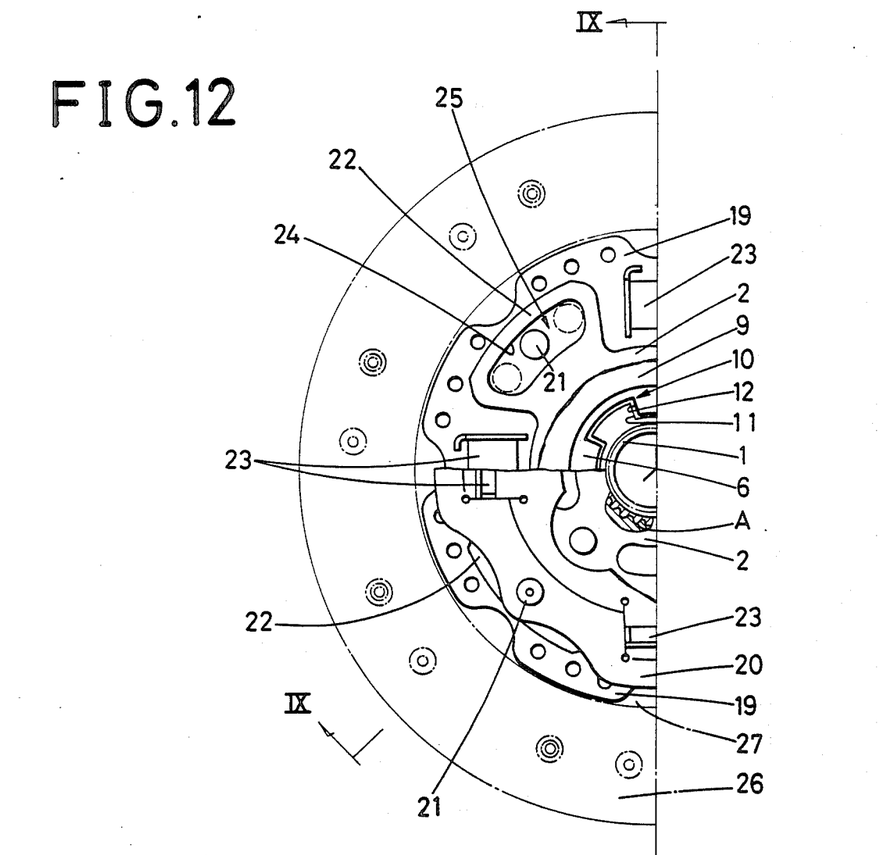
FIG. 12 is a half front view with a part cutaway of the clutch damper according to the embodiment.
Figure 13:
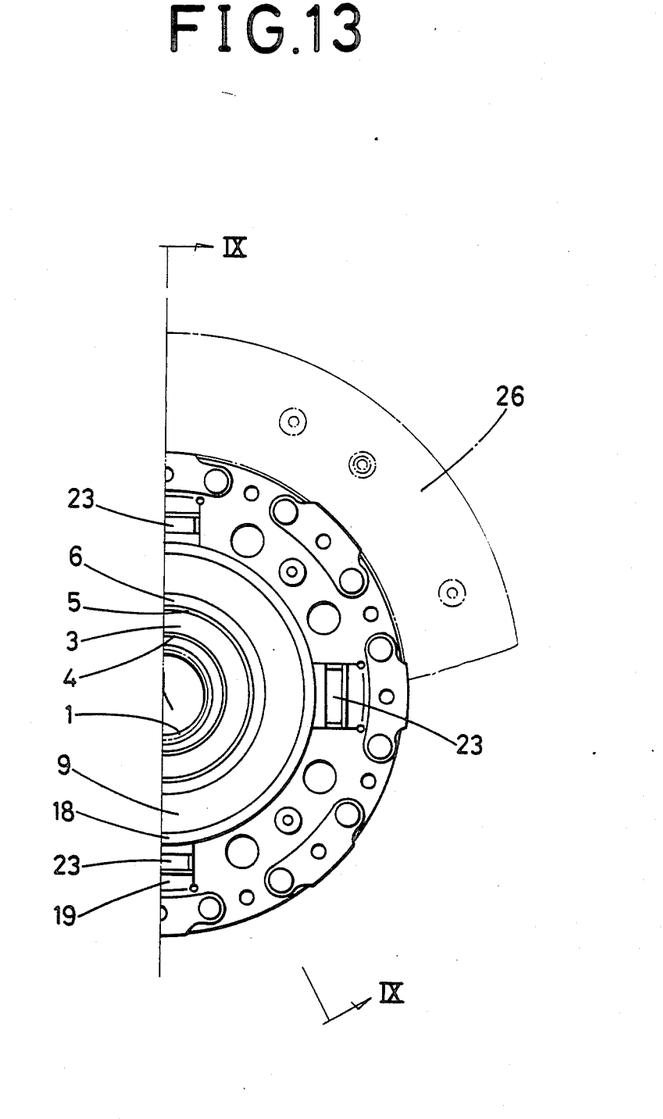
FIG. 13 is a half rear view of the clutch damper according to the embodiment.
Figure 14:
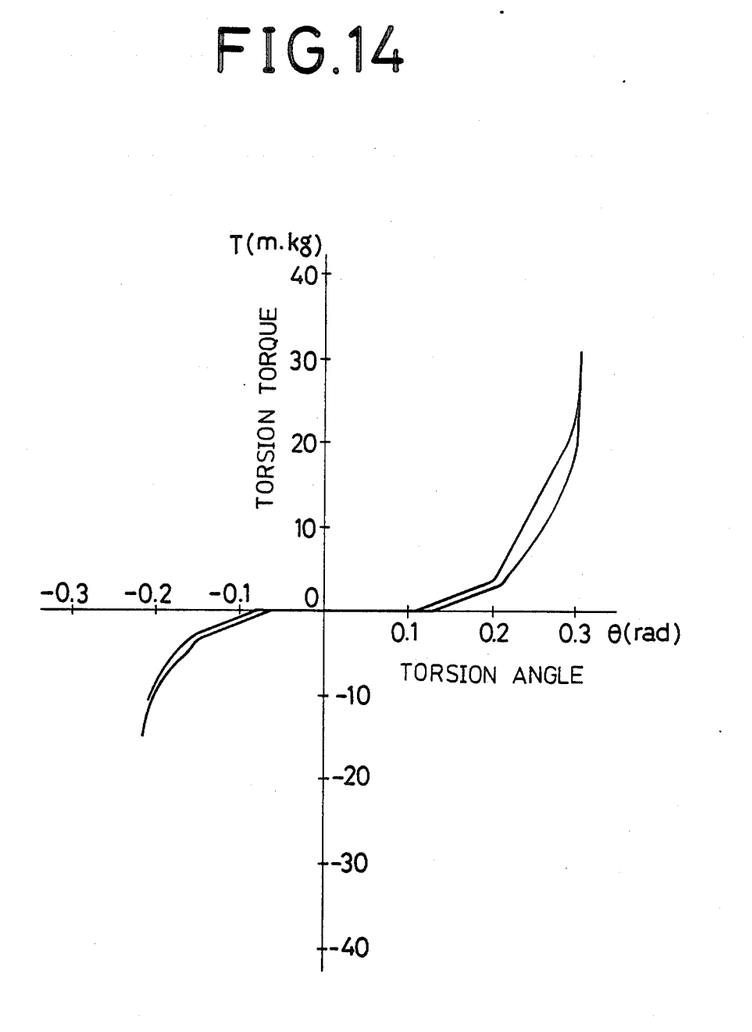
FIGS. 14 and 15 are graphic representations showing the torsional characteristics.
Figure 15:
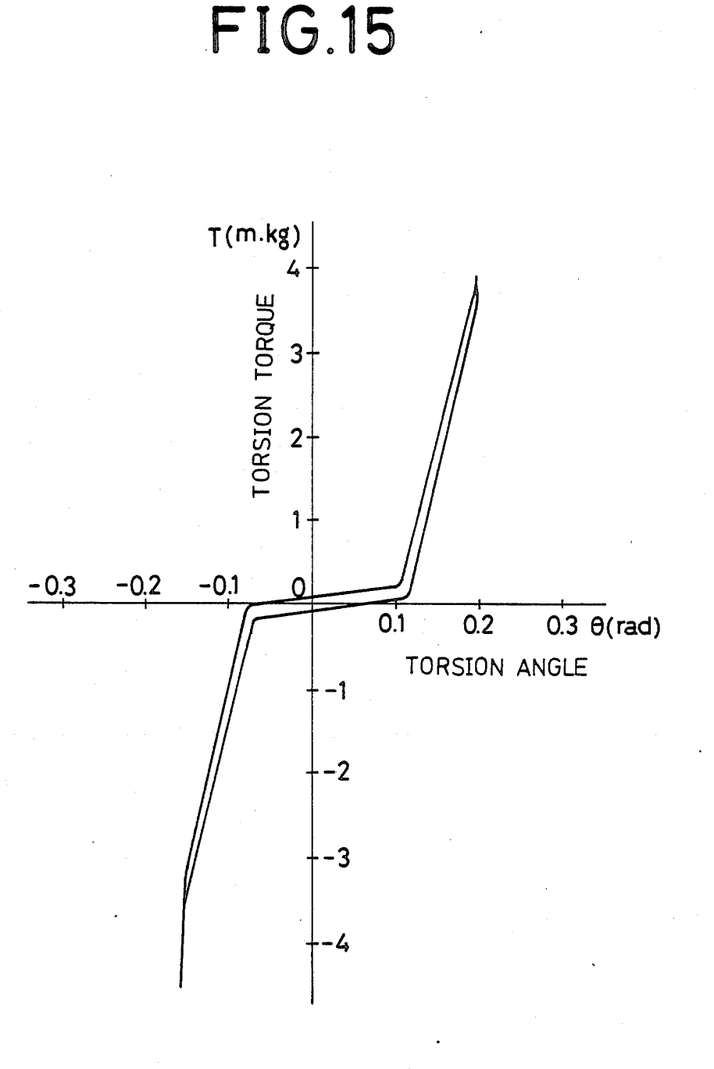

In this case, as shown in FIG. 11, the first thrust plate 31 is formed with a projection 37 in the outer periphery thereof, and is stopped relative to the boss by engagement of a recess 38 formed corresponding to the inner periphery of the cylindrical portion 7 of the boss 6 with the projection 37, whereas the second thrust plate 32 is stopped by engagement of the projection 39 formed in the end thereof with the engaging recess 12 of the hub 1. More specifically, according to the aforesaid spacer member, the fluorine-resin made thrust or radial bearings 34, 35 and 36 are interposed between the rigid sleeve 33 and center plate 29, between the first and second thrust plates 31, 32 and between the center plate 29 and hub 1, and both the thrust plates 21, 22 are rotated relative to the boss 6 or hub 1. With this arrangement, the rigid (metal) members are free of sliding contact portions and the same portions always come into sliding contact with each other to make it possible to obtain a stabilized hysteresis as shown in FIGS. 14 and 15. FIG. 15 is an enlarged graph of FIG. 14 to ±0.1 rad. Suppose that the rigid members come into sliding contact with each other in the spacer member, there involves inconveniences, namely, (1) it is not possible to obtain a stabilized hysteresis, and (2) there produces no abnormal-noise reducing effect due to the increased variation with the passage of time resulting from wear of the rigid members and the like. Furthermore, the aforementioned clutch damper may be modified in construction as follows:

(1) Engaging (stopping) means of the first and second thrust plates 31, 32 with the boss 6 and hub 1:
  (I) Machining accuracy of parts is improved and particularly fitting engagement is employed for locking without provision of the projections 37 and 39.
  (II) A stop pin is used for locking.
  (III) Adhesives or the like are used for locking.

(2) An 'R' is provided in bended outer end edges of the inner ring 4 and outer ring 5 to facilitate fitting.

(3) The inner ring 4 and the sleeve 33 are made integral with each other.

The clutch damper according to the present invention, as described above, displays excellent torque transmission power and vibration absorbing power which have not been achieved by prior art products, and has distinguished effects such that the stabilized hysteresis may be produced by the provision of the spacer member.

While the preferred embodiments of the present invention have been described, it will be obvious that other numerous modifications can be made without departing the principle of the present invention. It is therefore desirous that all modifications by which the effects of the present invention may be substantially obtained through the use of identical or corresponding construction are included in the scope of the present invention by the appended claims.

What is claimed is:

1. A clutch damper comprising a hub having an approximately cylindrical shape with an outwardly spread first plate provided at one axial end thereof, said hub being slipped over a shaft, a first buffer member formed into an annular body of a rubber-like resilient material and fitted and secured in the outer periphery of said hub, a boss having an approximately cylindrical shape and fitted and secured in the outer periphery of said first buffer member, a second buffer member formed into an annular body of a rubber-like resilient material and secured in the outer periphery of said boss, a cylindrical body and a second plate provided with a double-ring like plate spread outwardly from said cylindrical body and secured in the outer periphery of said second buffer member, a stopper mechanism for stopping relative rotation within a predetermned angle disposed between said hub and said boss and between said first plate of said hub and said double-ring like plate of said second plate, and spacer means for restraining play in both axial and diametral directions interposed between said hub and said boss, said spacer means comprising a center plate, a plate spring, a bearing plate and a fluorine-resin plate.

2. A clutch damper comprising a hub having an approximately cylindrical shape with an outwardly spread first plate provided thereon, said hub being disposed over a shaft, a first buffer means formed into an annular body of a rubber-like resilient material and fitted and secured on the outer periphery of said hub, a boss having an appropriately cylindrical shape and fitted and secured on the outer periphery of said first buffer means, a second buffer means formed into an annular body of a rubber-like resilient material and secured in the outer periphery of said boss, a second plate means secured on the outer periphery of said second buffer means, spring member means of a rubber-like resilient material secured to said second plate means, a first stopper means for limiting relative rotation within a predetermined angle disposed between said hub and said boss, and second stopper means for limiting relative rotation within a predetermined angle disposed between said first plate and said second plate means, whereby said first and second stopper means are operable to apply increasing torsional rigidity of said first and second buffer means and said spring member means smoothly while absorbing vibration.

3. A clutch damper according to claim 2, wherein said second stopper means comprises a projection means and a hole means, one of said projection means and said hole means being on said second plate means and the other of said recess means and said hole means being on said first plate member, said hole means receiving said projection means and being wider than said projection means to provide said limited relative rotational movement between said second plate means and said first plate member.

4. A clutch damper comprising a generally cylindrically-shaped hub, a first plate member mounted on said hub for rotation with said hub, first rubber-like resilient material secured to said hub, a generally cylindrically-shaped boss secured to the outer periphery of said first rubber-like resilient material, first stopper means between said hub and said boss operable to provide limited relative rotational movement between said hub and said boss, second rubber-like resilient material secured to the outer periphery of said boss, a second plate means secured to the outer periphery of said second rubber-like resilient material, a spring member means of a rubber-like resilient material secured to said second plate means, and second stopper means between said first plate member and said second plate means to provide limited relative rotational movement between said first plate member and said second plate means, whereby as increasing torque is progressively applied to said hub, said hub initially applies torque to said first rubber-like resilient material until said first stopper means is engaged and then applies torque to said second rubber-like resilient material until the second stopper means is engaged and then applies torque to said spring member means, whereby said first and second stopper means are operable to step-wise and progressively apply increasing torsional rigidity of said first and second rubber-like resilient material and said spring member means smoothly while absorbing vibration.

5. A clutch damper according to claim 4, wherein said first stopper means comprises a projection means and a recess means, one of said projection and recesss means being on said hub and the other of said projection and recess means being on said boss said recess means receiving said projection means and being wider than said projection means to provide said limited relative rotational movement between said hub and said boss.

* * * * *